United States Patent [19]

Hunger et al.

[11] 4,302,388
[45] Nov. 24, 1981

[54] MONOAZO COMPOUNDS DERIVING FROM META-AMINO-BENZOIC ACID ANILIDES AND ACETOACETYL AMINO-BENZIMIDAZOLONE

[75] Inventors: Klaus Hunger; Manfred Pesenacker, both of Kelkheim, Fed. Rep. of Germany

[73] Assignee: Hoechst Aktiengesellschaft, Frankfurt am Main, Fed. Rep. of Germany

[21] Appl. No.: 86,125

[22] Filed: Oct. 18, 1979

[30] Foreign Application Priority Data

Oct. 21, 1978 [DE] Fed. Rep. of Germany ....... 2845946

[51] Int. Cl.³ .................... C09B 29/01; C09B 29/32; D06P 1/44
[52] U.S. Cl. .................................. 260/157; 106/23; 106/288 Q; 106/308 Q; 106/311; 260/42.21; 260/208
[58] Field of Search ..................... 260/157; 106/288 Q

[56] References Cited

U.S. PATENT DOCUMENTS

| | | | |
|---|---|---|---|
| Re. 27,575 | 2/1973 | Ribua et al. | 260/157 |
| 3,109,842 | 11/1963 | Schilling et al. | 260/157 |
| 3,328,384 | 6/1967 | Dietz et al. | 260/157 |
| 3,956,266 | 5/1976 | Mory et al. | 260/157 |
| 4,080,321 | 3/1978 | Uunstmann et al. | 260/157 |
| 4,150,019 | 4/1979 | Frolich et al. | 260/157 |
| 4,169,830 | 10/1979 | Hunger | 260/157 |
| 4,195,020 | 3/1980 | Hunger et al. | 260/157 |

FOREIGN PATENT DOCUMENTS

| | | | |
|---|---|---|---|
| 1808017 | 6/1978 | Fed. Rep. of Germany | 260/157 |
| 2800765 | 7/1978 | Fed. Rep. of Germany | 260/157 |
| 1266615 | 3/1972 | United Kingdom | 260/157 |

*Primary Examiner*—Floyd D. Higel
*Attorney, Agent, or Firm*—Curtis, Morris & Safford

[57] ABSTRACT

When diazotizing a benzanilide of the formula

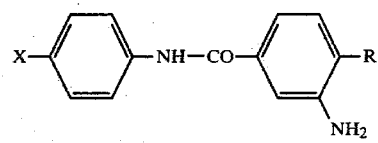

wherein R is chloro, methyl or methoxy and X is carbamoyl or acetamino, or, when R is chloro or methyl, X is also methyl or chloro, and coupling it onto 5-acetoacetylaminobenzimidazolone-(2), monoazo pigments are obtained which are useful for coloring plastics and lacquers. The pigments have a very good fastness to light, solvents, over-lacquering, bleeding and a high heat resistance.

5 Claims, No Drawings

MONOAZO COMPOUNDS DERIVING FROM META-AMINO-BENZOIC ACID ANILIDES AND ACETOACETYL AMINO-BENZIMIDAZOLONE

Subject of the present invention are azo compounds of the formula

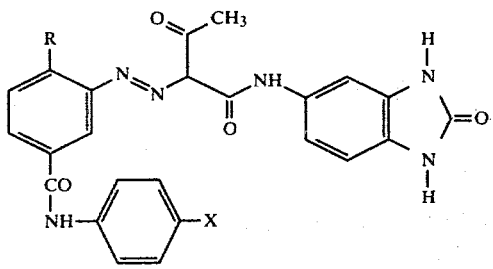

wherein R is chloro, methyl or methoxy; X is carbamoyl or acetamino, or, when R is chloro or methyl, X is also methyl or chloro.

Subject of the present invention further is a process for the manufacture of the said azo compounds, which comprises diazotizing compounds of the formula II

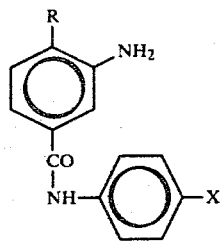

wherein R and X are as defined above and coupling the resulting diazonium compounds onto 5-acetoacetylaminobenzimidazolone-(2), for example in an aqueous medium.

A further subject of the present invention is the use of the azo compounds according to the invention as coloring matter, in particular as pigments.

The amines of the formula II can be diazotized, for example using alkali metal nitrites or lower alkylnitrites with acids of sufficient strength, in particular a mineral acid, or with nitrosylsulfuric acid. During diazotization as well as during the subsequent coupling reaction, surfactants such as non-ionic, anionic or cationic dispersing agents, may be suitably added.

Diazotization and coupling can alternatively be carried out in the presence of appropriate organic solvents, for example glacial acetic acid, lower alkanols, dioxan, formamide, dimethylformamide, dimethyl sulfoxide, pyridine or N-methyl-pyrrolidone. To obtain the full tinctorial strength and a particularly favorable crystal structure it is often advisable to heat the coupling mixture for some time, for example at boiling temperature or at a temperature above 100° C. under pressure, optionally in the presence of organic solvents such as lower alkanols, for example ethanol, halogen-aromatic compounds, such as chlorobenzene or dichlorobenzenes, for example o-dichlorobenzene, dimethylformamide or in the presence of a resin soap. Particularly pure pigments of high tinctorial strength are obtained using the products according to the invention when subjecting, after coupling, the moist filter cakes or the dried powders to a thermal aftertreatment with organic solvents, such as alcohols, in particular lower alkanols, pyridine, glacial acetic acid, dimethylformamide, N-methyl-pyrrolidone, dimethyl sulfoxide, halogen-aromatic compounds such as chlorobenzene or dichlorobenzenes, for example o-dichlorobenzene, or nitrobenzene, or when grinding the pigments with the addition of grinding auxiliaries.

By the term "lower" in connection with alkyl radicals there are to be understood groups having of from 1 to 6, in particular of from 1 to 4, carbon atoms.

The pigments may alternatively be obtained in the presence of a carrier, for example baryte.

The novel compounds are insoluble in water and in the common organic solvents and are suitable for pigmenting printing inks, lacquers and dispersion paints, for coloring plastics, caoutchouc and natural or synthetic resins. Moreover they are especially appropriate for coloring plastics such as polyolefins, whose processing temperatures are in many cases above 250° C. The pigments according to the invention are further suitable for pigment printing onto substrates, in particular onto textile fiber materials or onto other flat structures such as paper.

The pigments according to the invention may further be used in other application fields, for example in finely divided form for coloring rayon made of viscose, or cellulose ethers or esters, polyamides, polyurethanes, polyglycol terephthalates or polyacrylonitriles, in the spinning mass, or for coloring paper.

The pigments can be well processed in the said media. The dyeings obtained therewith are distinguished by very good fastness to light and in particular by outstanding heat resistance, by resistance to chemicals, in particular to solvents, by good fastness to overvarnishing in lacquers and to bleeding in plastics.

The following examples illustrate the invention. Percentages are by weight.

EXAMPLE 1

27 g of 4-(3'-amino-4'-methylbenzoylamino)-benzamide are stirred in 200 ml of water for 15 minutes, thereafter 40 ml of concentrated hydrochloric acid are added and stirring is continued for a further 45 minutes. The reaction mixture is diazotized at 5° to 10° C. for 1 hour using 13.5 ml of 40% sodium nitrite solution. Stirring is continued for 1 hour at 10° to 20° C., the mixture is adjusted to a volume of 500 ml and the excess nitrite is destroyed with amidosulfonic acid.

24 g of 5-acetoacetylamino-benzimidazolone-(2) are suspended in 200 ml of water and dissolved by adding 15 ml of 33% sodium hydroxide solution. The resulting mixture is added while well stirring, at 15° to 18° C., within 20 minutes under the surface of a mixture of 150 ml of water, 20 ml of glacial acetic acid, 200 ml of 4 N sodium acetate solution and 5 ml of a 10% solution of the reaction product of stearyl alcohol and 25 mols of ethylene oxide.

Stirring is continued for 30 minutes. Then the suspension of the diazonium salt is added at 20° to 25° C. under the surface of the precipitated coupling component suspension. Upon the completion of the addition of the diazonium salt suspension, stirring is continued for 1 hour at room temperature, then the product is heated to 90° C. and kept at this temperature for 30 minutes, cooled with ice to 70° C., collected by suction-filtration and washed salt-free with water.

The crude pigment is dried at 70° C., subsequently ground, stirred in glacial acetic acid at 35° C. for 20 minutes and collected by filtration. Then the product is washed successively with ethanol and with water and dried at 70° C. This gives an orange monoazo pigment of the structure

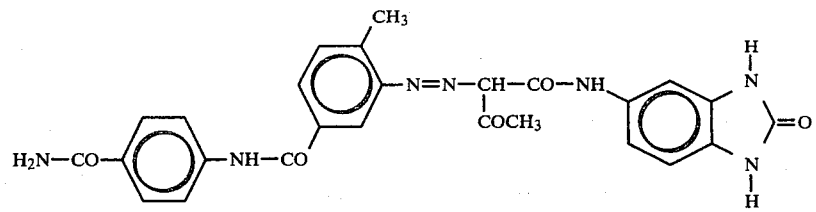

which, when incorporated into an alkyd resin-melamine resin clear varnish yields yellow-orange dyeings having good fastness to overvarnishing. High-density polyethylene colored with this pigment is distinguished by outstanding heat resistance. The fastness to light of the pigment both when incorporated into varnishes and into plastics is good as well.

EXAMPLE 2

30 g of 4-(4'-methoxy-3'-aminobenzoylamino)-1-acetylaminobenzene are stirred in 500 ml of water and 40 ml of 31% hydrochloric acid for 1 hour. The reaction mixture is cooled to 5° C. with ice and subsequently diazotized by adding 14 ml of 40% sodium nitrite solution under the surface of the mixture and stirring for further 45 minutes at 100° C. The excess nitrite is thereafter destroyed using amidosulfonic acid.

Simultaneously 24 g of 5-acetoacetylamino-benzimidazolone-(2) are suspended in 200 ml of water in a second receptacle and dissolved by adding 20 ml of 33% sodium hydroxide solution. The resulting solution is added in 30 minutes, while well stirring, at 15° to 18° C. under the surface of a mixture of 200 ml of water, 200 ml of 4 N sodium acetate solution, 20 ml of glacial acetic acid and 10 ml of a 10% solution of the reaction product of stearyl alcohol and 25 mols of ethylene oxide. The suspension is stirred for further 30 minutes. Subsequently the diazonium salt suspension is added at 20° to 25° C. in 1.5 hours under the surface of the suspension of the coupling component. Upon completion of the diazonium salt addition, stirring is continued for one hour at room temperature, whereupon the reaction mixture is heated to 90° C. and kept at this temperature for 30 minutes. Thereafter the pigment suspension is cooled with ice to 70° C., collected by filtration and washed salt-free with water. The crude pigment is stirred for 1.5 hours in glacial acetic acid at 80° C. and collected by filtration. The pigment obtained is washed first with ethanol and thereafter with water and dried at 70° C. The resulting monoazo pigment of the structure

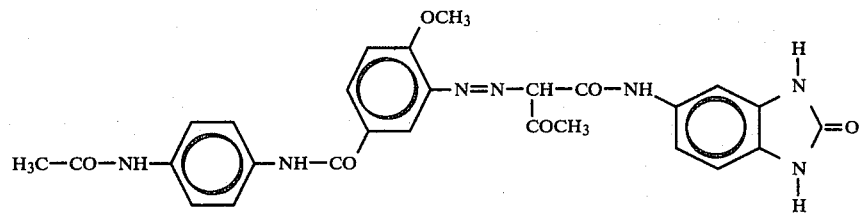

yields yellow-orange dyeings having good fastness to overvarnishing and outstanding fastness to light when incorporated into an alkyd resin-melamine resin clear varnish. High-density polyethylene pigmented with this product is distinguished by very good heat resistance.

EXAMPLE 3

24 g of 4-(3'-amino-4'-methylbenzoylamino)-toluene are stirred in 250 ml of dimethylformamide for 30 minutes. After the addition of 40 ml of 31% hydrochloric acid the temperature is adjusted to 10° C. by exterior cooling. As soon as this temperature is reached, 100 ml of 1 N sodium nitrite solution are added dropwise and the temperature of the reaction mixture is maintained at no more than 10° C. while well stirring for 30 minutes. Thereafter a solution of 24 g of 5-acetoacetylamino-benzimidazolone-(2) in 250 ml of dimethylformamide is added to the solution of the diazo component. A solution of 100 ml of 4 N sodium acetate solution is added dropwise within 30 minutes and then 150 ml of water. The mixture is stirred for one hour at a temperature below 25° C., heated with steam, filtered at 80° C., washed salt-free with water and dried at 60° to 70° C. 39.5 g of a yellow-red pigment having the following formula are obtained:

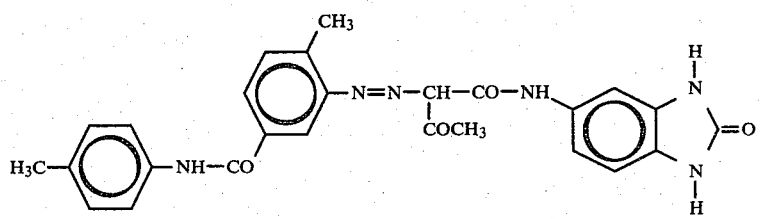

When incorporated into an alkyd resin-melamine resin clear varnish the pigment yields reddish-yellow dyeings having good fastness to overvarnishing and outstanding fastness to light. High-density polyethylene dyed with the pigment is distinguished by outstanding heat-resistance and very good fastness to light.

The azo compounds according to the invention listed in the following table are prepared in conformity with Examples 1 to 3 by coupling a diazotized amine onto 5-acetoacetylamino-benzimidazolone-(2):

| Ex. | Diazo component | Shade |
|---|---|---|
| 4 | 4-(3'-amino-4'-methylbenzoylamino)-1-acetylamino-benzene | reddish-yellow |
| 5 | 4-(3'-amino-4'-methoxybenzoylamino)-benzamide | reddish-yellow |
| 6 | 4-(3'-amino-4'-methylbenzoylamino)-chloroaniline | reddish-yellow |
| 7 | 4-(3'-amino-4'-chlorobenzoylamino)-benzamide | reddish-yellow |
| 8 | 4-(3'-amino-4'-chlorobenzoylamino)-acetylaminobenzene | reddish-yellow |
| 9 | 4-(3'-amino-4'-chlorobenzoylamino)-chlorobenzene | reddish-yellow |
| 10 | 4-(3'-amino-4'-chlorobenzoylamino)-methylbenzene | reddish-yellow |

What is claimed is:

1. A compound of the formula

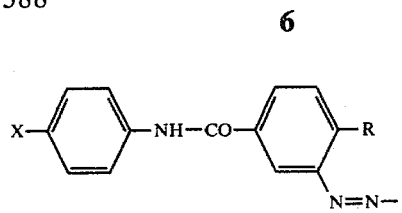
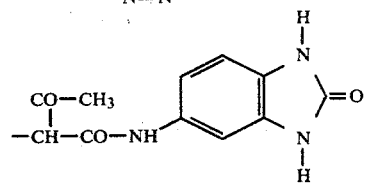

wherein R is methyl or chloro and X is carbamoyl or acetamino.

2. The compound as claimed in claim 1, wherein R is methyl and X is carbamoyl.

3. The compound as claimed in claim 1, wherein R is methyl and X is acetamino.

4. The compound as claimed in claim 1, wherein R is chloro and X is carbamoyl.

5. The compound as claimed in claim 1, wherein R is chloro and X is acetamino.

* * * * *